United States Patent [19]
Murayama et al.

[11] Patent Number: 4,989,414
[45] Date of Patent: Feb. 5, 1991

[54] CAPACITY-CONTROLLABLE AIR CONDITIONER

[75] Inventors: Akira Murayama; Hiroaki Kuno; Naoshi Uchikawa; Jyoji Okamoto; Hiroyuki Imamura, all of Shimizu, Japan

[73] Assignees: Hitachi, Ltd, Tokyo; Shimizu Engineering Co., Ltd., Shizuoka, both of Japan

[21] Appl. No.: 425,229

[22] Filed: Oct. 23, 1989

[30] Foreign Application Priority Data

Oct. 26, 1988 [JP] Japan .................. 63-270376

[51] Int. Cl.$^5$ .................. F25B 41/04; F25B 1/00
[52] U.S. Cl. .................. 62/228.4; 62/196.3; 62/217
[58] Field of Search .......... 62/228.4, 228.5, 228.3, 62/228.1, 217, 215, 196.1, 196.2, 196.3

[56] References Cited

U.S. PATENT DOCUMENTS

| | | | |
|---|---|---|---|
| 4,282,719 | 8/1981 | Kountz et al. | 62/228.1 X |
| 4,419,866 | 12/1983 | Howland | 62/228.4 |
| 4,526,012 | 7/1985 | Chigira | 62/196.3 |

FOREIGN PATENT DOCUMENTS 0140884 12/1986 Japan .

Primary Examiner—Harry B. Tanner
Attorney, Agent, or Firm—Antonelli, Terry, Stout & Kraus

[57] ABSTRACT

An air conditioner provided with a refrigerant circuit formed by connecting with piping a refrigerant compressor, a condenser, an expansion means and an evaporator, an inverter power supply means for controlling the rotational speed of an electric motor for driving the refrigerant compressor, a load detector, and a controller for controlling the inverter power supply means on the basis of an output from the load detector. A refrigerant flow passage controlling mechanism is provided to change the rate at which the refrigerant flows through the condenser on the basis of a control command from the controller, thereby making it possible to reduce or increase the discharge rate without extending the range of changes in the rotational speed of the compressor. The compressor can be controlled according to a wide range of changes in the load to operate with an operation range which ensures high efficiency of the compressor operation.

4 Claims, 7 Drawing Sheets

CAPACITY-CONTROLLABLE AIR CONDITIONER

BACKGROUND OF THE INVENTON

This invention relates to an air conditioner the capacity of which can be controlled to be optimized with respect to a wide range of changes in the load.

Conventionally, methods for controlling air conditioners according to changes in the load were developed, including one adopted for air conditioners having a multi-cylinder reciprocating compressor and based on changing the number of effective cylinders (unloading), and one based on changing the number of poles of the motor by changing over connections thereof from the outside to select the operating speed of the compressor.

Thereafter, with development of rotating type compressors such as rotary compressors and scroll compressors, inverter driving systems for selecting the rotational speed of the compressor by changing the frequency of the current for power supply to the compressor driving motor have been put to practical use. A type of air conditioner, such as the one disclosed in Japanese patent Unexamined Publication No. 63-140884, having a scroll compressor with an inverter driving system has been proposed prior to the present invention. Specifically, in FIG. 6 of this publication, a refrigerant circuit of an air conditioner having an inverter driving system is illustrated which is composed of a scroll compressor, an indoor heat exchanger, an expansion valve, and an outdoor heat exchanger. A refrigerant circulation passage is reversed for cooling or heating operation by a four-way change-over valve provided in the refrigerant circuit. The speed at which the scroll compressor is rotated can be changed by an inverter interposed between an ac power source and a motor for driving the compressor. The frequency of the driving current output from the inverter is controlled according to the indoor cooling load or heating load. Ordinarily, when the compressor rotates at a low speed, it operates at a low pressure ratio, that is, the discharging pressure is low while the drawing pressure is high or, when the compressor rotates at a high speed, it operates at a high pressure ratio, that is, the discharging pressure is high while the drawing pressure is low.

To change the capacity of the air conditioner in response to a change in the load, the discharge rate of the compressor may be changed. However, in a case where a reciprocating compressor is controlled by the method of changing the rotational speed of the compressor with the inverter, the range of changes in the rotational speed is restricted due to vibrations of a reciprocating member and noise generated therefrom. In the case of a rotating type compressor such as a rotary or scroll compressor, the range of changes in the rotational speed is comparatively extended. With development of multiple room air conditioners for air-conditioning a plurality of rooms, however, there is a need for a further improvement in the capacity variation range.

To meet this requirement, the range of changes in the rotational speed of the compressor may be extended by extending the range of frequencies with which the driving current is supplied from the inverter to the compressor. During high speed operation, however, problems relating to the strengths of mechanical parts and to the reliability of the bearing are encountered because the load increases as centrifugal forces applied to movable parts increase, and the problem of increases in mechanical and fluid losses are also encountered resulting in a reduction in the efficiency such that a larger input is required for the same work. During low speed operation, the following problems are encountered. That is, the rate at which the refrigerant gas leaks out of the compression space is increased, resulting in a reduction in the efficiency. It is difficult to form the desired oil film on the sliding portion and, hence, to achieve the desire reliability. In the case of a compressor with a lubrication oil pump utilizing a centrifugal force, it is difficult to maintain the desired oil supply rate.

Thus, it is undesirable to design the compressor to extend the capacity variation range only by extending the range of changes in the rotational speed of the compressor.

SUMMARY OF THE INVENTION

It is an object of the present invention to widen the capacity variation range without extending the range of changes in the rotational speed of the compressor.

To achieve this object, according to the present invention, there is provided an air conditioner having a refrigerant circuit formed by connecting with piping a refrigerant compressor, a condenser, an expansion means and an evaporator, an inverter power supply means for controlling the rotational speed of an electric motor for driving the refrigerant compressor, a load detecting means, a controller for controlling the inverter power supply means on the basis of an output from the load detecting means, and refrigerant flow passage control means for changing, in accordance with an instruction from the controller, the rate at which a refrigerant flows from the refrigerant compressor to the condenser.

The upper limit of the frequency of the current for supply of power from the inverter power supply means to the compressor driving electric motor and, hence, the upper limit of the rotational speed of the electric motor is determined by the centrifugal load on the compressor, while the lower limit is determined by the state of the oil film on the bearing portion, the capacity of the lubrication pump and so on. The refrigerant passage control means is provided to further extend the range of changes in the compressor discharge capacity attained by the inverter control alone. The controller compares detection values from the load detecting means with set values to effect control with the inverter power supply means and, if it is necessary to further increase the extent of change in the capacity, utilizes the refrigerant flow passage control means to change the rate at which the refrigerant flows from the refrigerant compressor to the condenser, thereby enabling a wider range of capacity control based on the combination of the ordinary control means and the capacity control mechanism.

As described above, changes in the rotational speed of the compressor are limited within the range of high efficiency compressor operation without changing the discharge capacity of the compressor only by the rotational speed control. The upper and lower limits of changes in the discharge capacity obtained by changes in the rotational speed of the compressor can be further extended by the refrigerant flow passage control means, thereby enabling the air conditioner to operate according to a wide range of changes in the load.

DESCRIPTION OF THE PREFERRED EMBODIMENTS

Figure 1:
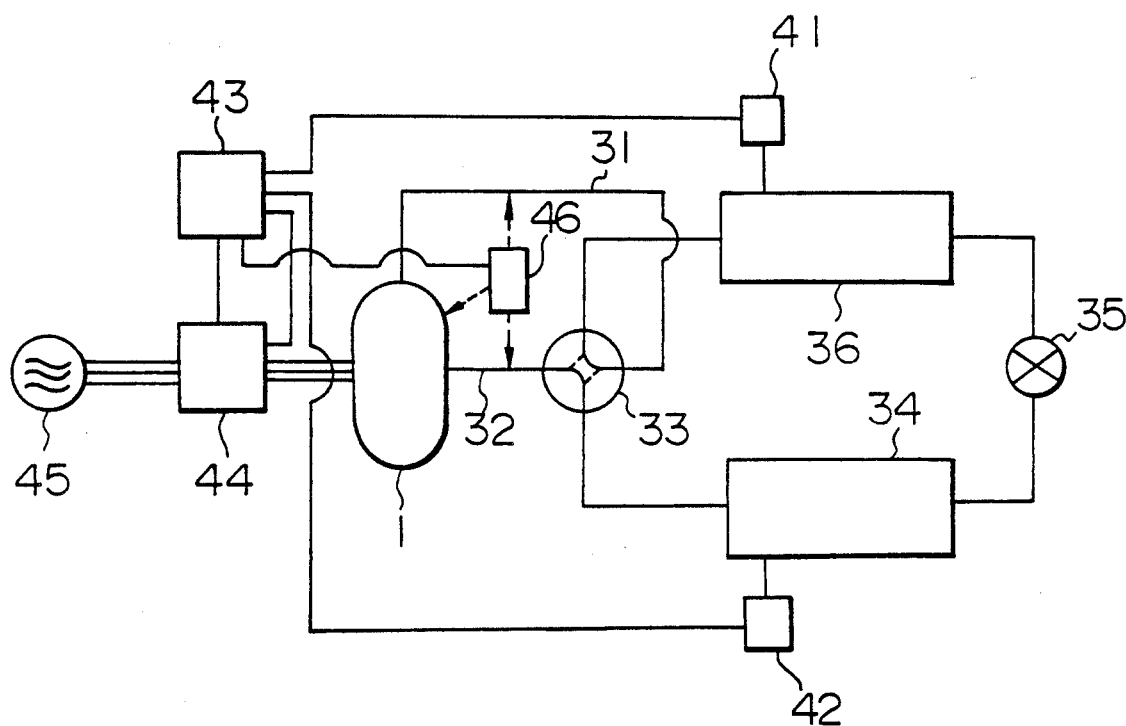
FIG. 1 is a diagram of the basic construction of air conditioners which represent embodiments of the present invention.

FIG. 1 shows a general basic construction of air conditioners which represent embodiments of the present invention.

The air conditioner has a compressor 1 (incorporating a driving electric motor), an indoor heat exchanger 34, an outdoor heat exchanger 36, an expansion valve 35, a four-way change-over valve 33, pipings 31, 32 and other pipings, which connect these components as illustrated, detectors 41 and 42, a controller 43, an inverter 44, and a flow rate controlling mechanism 46. Pipings 31 and 32 are connected to the compressor 1 at the inlet side and at the outlet side thereof, respectively. The inverter 44 can change the rotational speed of the compressor by changing the frequency of a current for power supply from a power source 45 to the electric motor of the compressor 1. A gas compressed in the compressor 1 is supplied to the indoor heat exchanger 34 or to the outdoor heat exchanger 36 via the four-way change-over valve 33 to effect a heating or cooling operation. FIG. 1 shows a state of heating operation.

Figure 2:
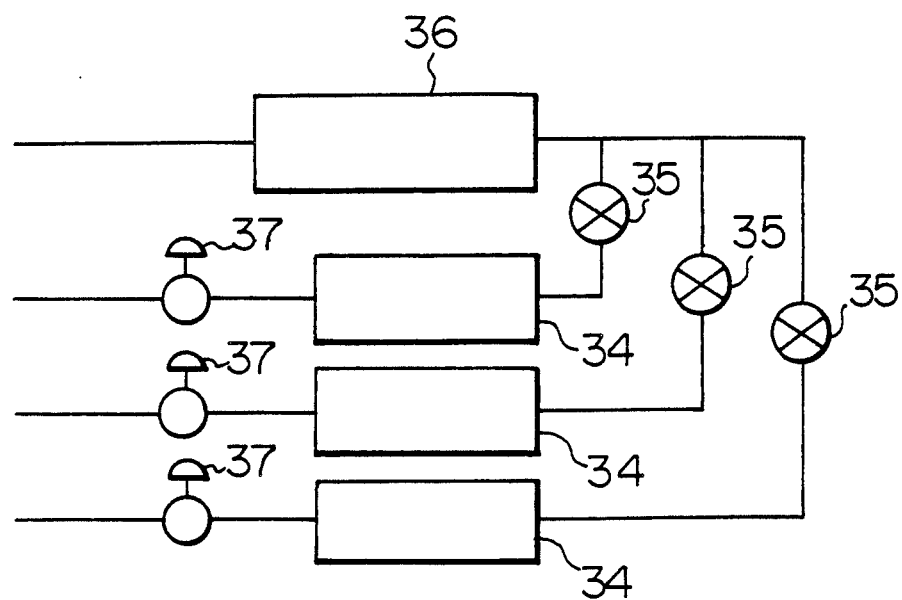
FIG. 2 is a diagram illustrating a modification of part of the arrangement shown in FIG. 1.

Only one indoor heat exchanger 34 may be used. For air conditioning of a plurality of rooms, however, a plurality of indoor heat exchangers 34 may be provided in parallel with each other together with respective expansion valves 35, as shown in FIG. 2. If in this case a closing valve 37 is provided for each heat exchanger, the desired distribution of the refrigerant in the cycle can be maintained. The expansion valve 35 shown in FIGS. 1 and 2 may be a capillary type restrictor or a temperature sensing type expansion valve, but a variable expansion valve the opening of which can be controlled from the outside is more effective for control of a wider range of capacity.

Referring to FIG. 1, the detectors 41 and 42 detect the states of the indoor and outdoor heat exchangers, that is, the states on high pressure and low pressure sides of the refrigerating cycle; the temperatures or the pressures of the indoor and outdoor heat exchangers 34 and 36 may be directly detected or the temperatures of blowing air at the outlets of the indoor and outdoor heat exchangers 34 and 36 may be detected. For detection of the pressures, a method of directly detecting the pressures or a method of detecting temperatures and correcting and converting the detected temperatures into pressures may be selected.

The controller 43 compares data from the detectors 41 and 42 with set values of room temperature, and outputs a speed increasing signal to the inverter 44 if the capacity is insufficient for the load, or outputs a speed reducing signal if the capacity is excessive for the load. The inverter 44 receives the signal from the controller 43, and changes the frequency of the power supply current to the compressor 1 to control the rotational speed of the compressor 1. In this case, the upper and lower limits of the frequency variation range of the inverter 44 or the range of changes in the rotational speed of the compressor 1 are set; the upper limit is determined in consideration of, for example, centrifugal force load and so on while the lower limit is determined in consideration of, for example, formation of an oil film in the bearing, the oil supply capacity of the lubrication pump and so on. The upper and lower limits thereby set are memorized in the controller 43.

The controller 43 compares data from the detectors 41 and 42 and a frequency signal from the inverter 44 with the conditions of the compressor operation stored in its internal memory, and sends a signal to the flow rate controlling mechanism 46 to control the same. The flow rate controlling mechanism 46 controls the rate at which the refrigerant flows through the indoor heat exchanger 34 or, during cooling, through the outdoor heat exchanger 36. The control of this flow rate effected by of flow rate controlling mechanism 46 enables the capacity variation range to be extended beyond the limit determined by the upper or lower limit of the frequency variation range of the inverter. That is, if it is necessary to reduce the capacity below the limit determined by the lower limit of the frequency variation range of the inverter, unloading (bypassing from a high pressure side or an intermediate compression pressure side to a low pressure side) is effected by a means described later. If it is necessary to increase the capacity beyond the limit determined by the upper limit of the inverter frequency range, supercharging is effected by another means described later. The control effected by the flow rate controlling mechanism 46 can also be applied for restricting the operating pressure of the compressor within an allowable operating pressure range for maintenance of the desired reliability or within a high-efficiency operating pressure range; the temperatures or pressures on the high pressure and low pressure sides detected by the detectors 41 and 42 are compared with set temperature or pressure values corresponding to the respective inverter frequencies, which values are stored in the controller 43, thereby controlling the refrigerant flow rate.

The present invention will be described below with respect to embodiments thereof and, more specifically, to examples of the flow rate controlling mechanism 46.

Figure 3:
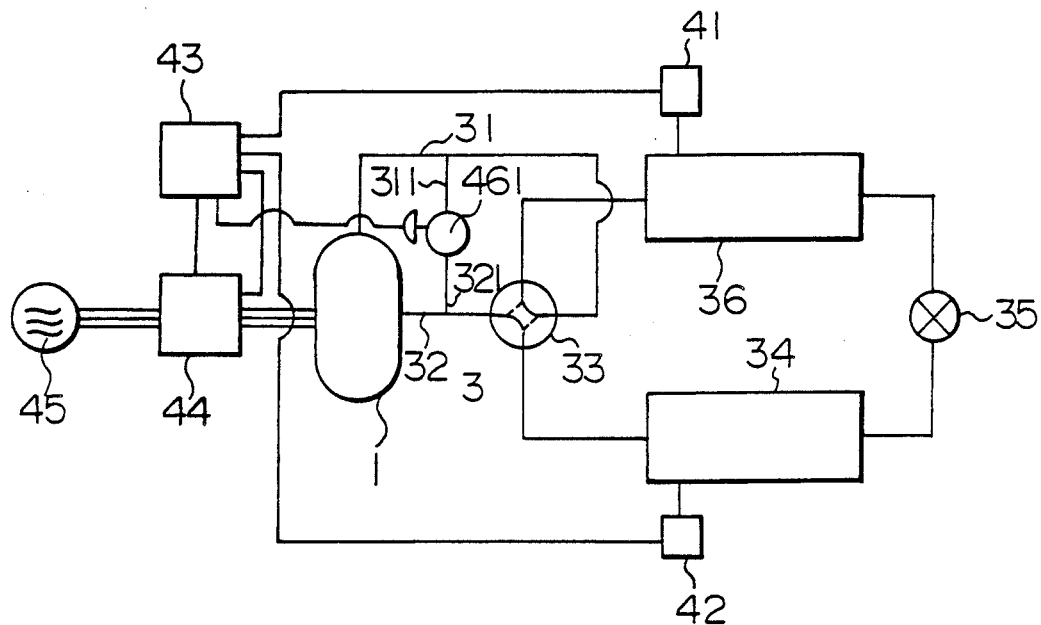
FIGS. 3 and 4 are diagrams of the constructions of air conditioners in accordance with different ones of the embodiments of the present invention.

FIG. 3 shows an example of the flow rate controlling mechanism 46 that controls the rate at which the refrigerant flows through the heat exchanger. In this embodiment, the flow rate controlling mechanism 46 has a function of reducing the rate at which the refrigerant flows through the heat exchanger, and is constructed in such a manner that the inlet pipe 31 of the compressor 1, i.e., a low pressure portion of the refrigerant circuit and the outlet pipe 32 of the compressor 1, i.e., a high pressure portion of the refrigerant circuit are connected by a piping 311, a closing valve 461 and a piping 321. When the closing valve 461 is opened, part of the gas on the outlet side flows to the inlet side so that the rate at which the gas flows through the heat exchanger 34 is reduced. In this embodiment, it is possible to prevent the compressor from operating with an excessive pressure or from operating intermittently in an on-off manner by the operation of a protective device which operates in response to an excessive increase in the outlet pressure in the refrigerating cycle. Also, this embodiment is advantageous because it requires no specific mechanism for the compressor.

Figure 4:
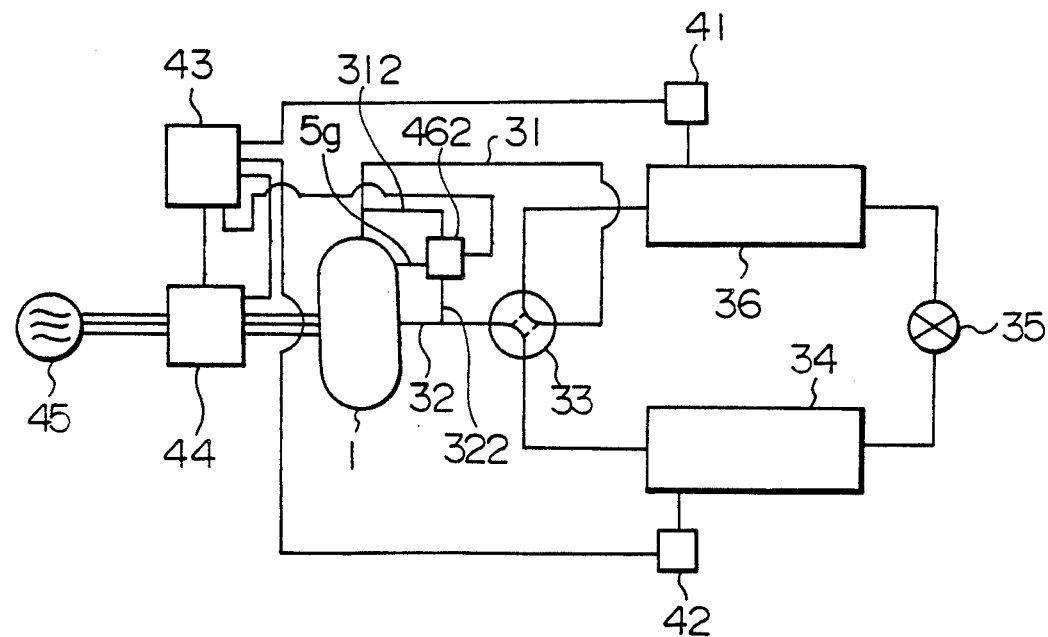

In another embodiment illustrated in FIG. 4, the flow rate controlling mechanism 46 is constructed in such a manner that a pipe 5g extending from an internal portion of the compressor 1, the inlet piping 31 and the outlet piping 32 are connected by a piping 312, a change-over valve 462 and a piping 322. To reduce the discharge rate, the change over valve 462 is operated to provide communication between the piping 5g and the inlet pipe 31. In other cases, the change-over valve 462 is operated to provide communication between the piping 5g and the outlet pipe 32. In the example shown in FIG. 4, the change-over valve 462 is used for the flow rate control mechanism. However, this embodiment includes another possible arrangement in which the piping 5g diverges to the inlet pipe 31 and to the outlet pipe 32 and a closing valve is provided in each of the branches.

Figure 5:
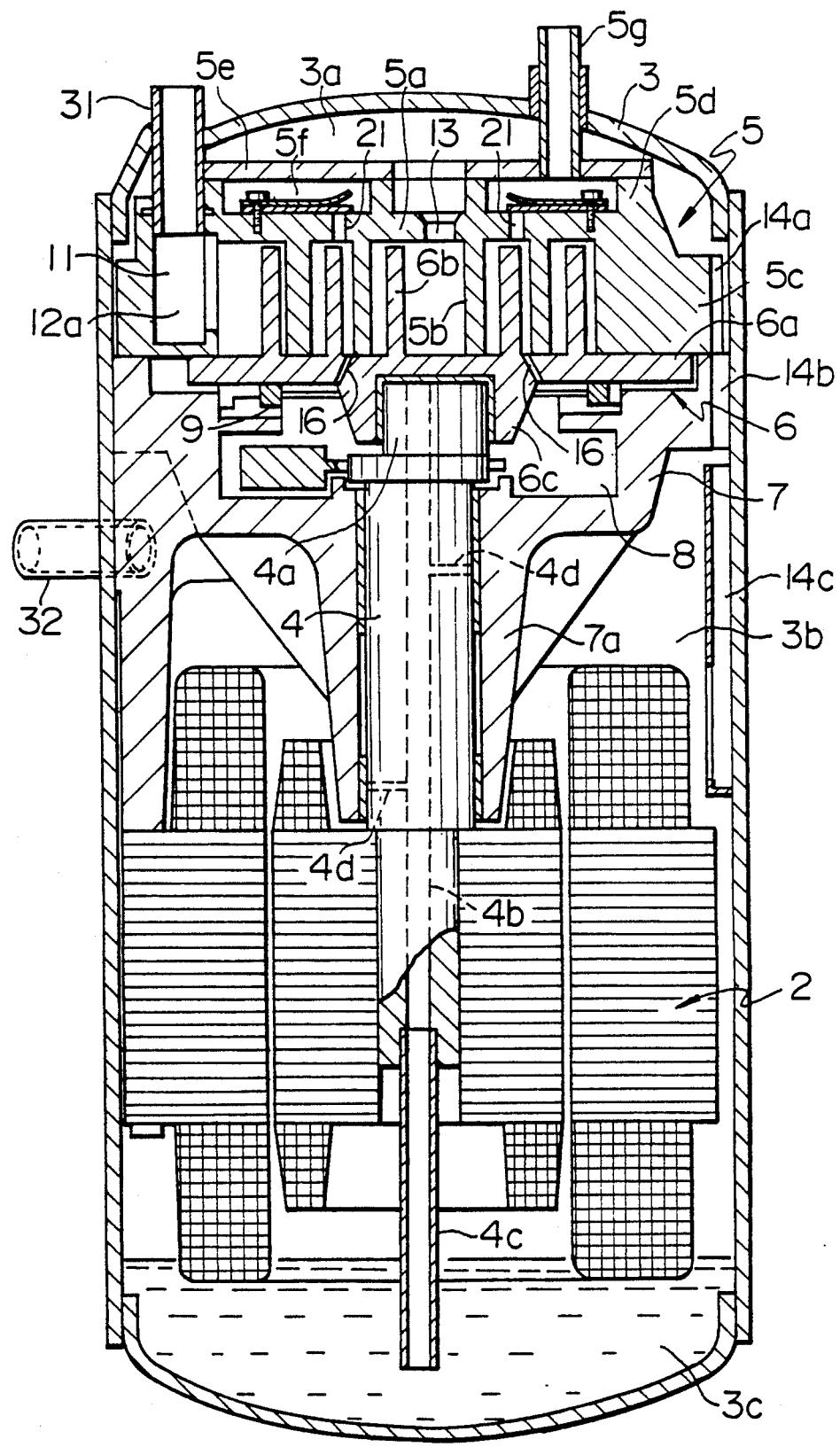
FIG. 5 is a cross-sectional view of the compressor shown in FIG. 4.

FIG. 5 shows a cross-sectional view of a scroll compressor used in accordance with the embodiment shown in FIG. 4. A compressor section having a stationary scroll 5 and a revolving scroll 6 is directly connected to an electric motor, and these components are accommodated in a sealed casing 3.

The stationary scroll 5 has a mirror plate 5a, a spiral scroll lap 5b formed integrally with the mirror plate 5a so as to be perpendicular to the same, and an outer wall portion 5c formed at its outer peripheral end and having the same height as the lap. The revolving scroll 6 has a mirror plate 6a, a spiral scroll lap 6b formed integrally with the mirror plate 6a so as to be perpendicular to the same, and a boss 6c formed on the side remote from the mirror plate 6a. The stationary scroll 5 and the revolving scroll 6 are combined so that the laps 5b and 6b face inward, thereby forming a compression space between the laps. The stationary scroll 5 is fixed to a frame 7 press-fitted in the sealed casing 3.

The frame 7 has a bearing portion 7a formed at its center to support a driving shaft 4. A back pressure space 8 is formed on the backside of the mirror plate 6a of the revolving scroll 6. A stator of the electric motor 2 is fixed to the frame 7.

An eccentric shaft 4a which projects upward from the upper end of the driving shaft 4 which is directly connected to a rotor of the electric motor, is inserted into the boss 6c of the revolving scroll 6. A revolving scroll rotation preventing mechanism 9 is provided between the frame 7 and the mirror plate 6a of the revolving scroll 6 to enable the revolving scroll 6 to effect a revolving motion relative to the stationary scroll 5 without tuning on its axis, when the driving shaft 4 rotates.

An inlet opening 11 is formed in an outer peripheral portion of the stationary scroll 5, and the inlet pipe 31 passing through the sealed casing 3 is connected to the inlet opening 11. An outlet opening 13 is formed in a central portion of the mirror plate 5a of the stationary scroll 5 so as to open to an outlet chamber 3a formed above the stationary scroll 5. The outlet chamber 3a communicates with a chamber 3b defined above the electric motor 2 via passages 14a to 14c. The discharge pipe 32 is connected to the chamber 3b by being led through the wall of the sealed casing 3. The passage 14b is formed in an outer peripheral portion of the frame 7 press-fitted in the sealed casing 3, and the passage 14c is disposed so as to face the passage 14b. The passage 14c is formed by a channel member disposed along an inner surface of the sealed casing 3. The lower end of this channel member functions as a collision plate which stops the gas flow, and an opening is formed in an inner wall portion of the channel member in the vicinity of the lower end thereof so as to face a stator coil end of the electric motor 2. The direction in which the gas flows along the inner surface of the casing is changed at this portion so that the gas flows to the coil end of the electric motor, thereby separating oil from the gas.

Back pressure holes 16 for communication between the compression space and the back pressure space 8 during compression is formed through the mirror plate 6a of the revolving scroll so as to communicate with the two sections of the compression space symmetrically formed by the engagement between the laps of the stationary and the revolving scrolls. When the scroll compressor operates, an intermediate gas pressure during compression between the drawing pressure and the discharging pressure is introduced from the compression space to the back pressure space 8 via the back pressure hole 16. During operation, the revolving scroll 6 is pressed in the axial direction against the stationary scroll 5 by this back pressure, thereby maintaining the desired axial-direction sealing between the mirror plates 5a and 6a and the ends of the laps 6b and 5b.

A lubrication hole 4b is formed in the driving shaft 4 at the center thereof, and a oil drawing pipe 4c is sttached to the lower end of the driving shaft 4. Another lubrication hole 4d extends from the lubrication hole 4b for communication with the bearing. Oil accumulated in a lower portion 3c of the sealed casing 3 is supplied to the bearing via the oil drawing pipe 4c and the lubrication holes 4b and 4d by a differential pressure between the lower portion 3c and the back pressure space 8.

Figure 6:
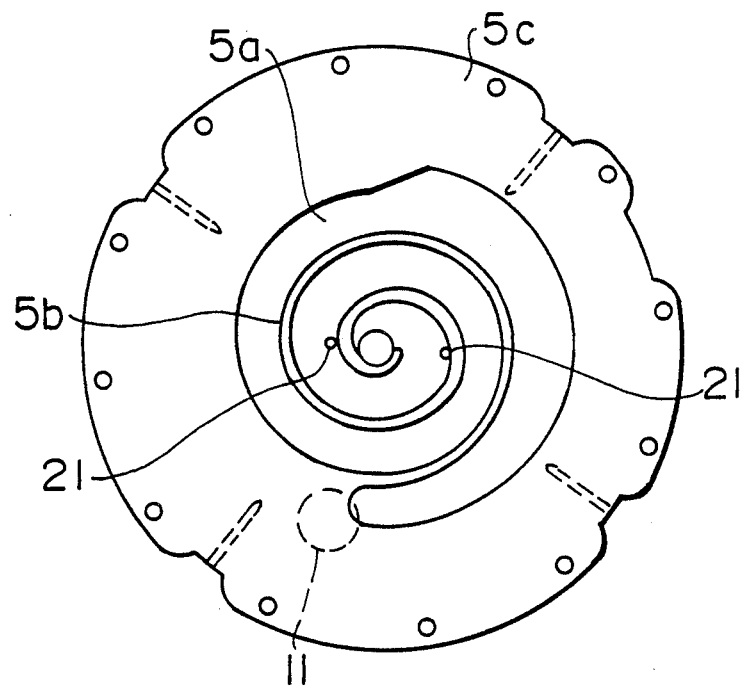
FIG. 6 is a bottom view of the stationary scroll of the compressor shown in FIG. 4.
Figure 7:
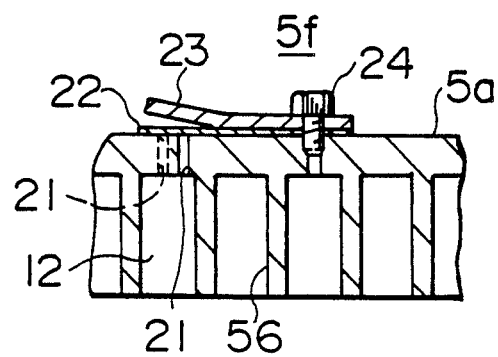
FIG. 7 is a cross-sectional view of a portion of the compressor shown in FIG. 4 in the vicinity of a bypass hole.

As illustrated in a bottom view of the stationary scroll 5 shown in FIG. 6, two bypass holes 21 having a diameter approximately equal to the thickness of the lap 5b are formed through the mirror plate 5a of the stationary scroll in positions in the vicinity of the lap 5b such that the compression chambers are bypassed to the side of the mirror plate 5a remote from the lap at a pressure ratio of 50 to 70% of a set pressure ratio. The set pressure ratio is the ratio of the pressure in the compression space obtained immediately before this space communicates with the outlet hole 13 to the pressure in the compression space obtained when the compression space between the laps of the stationary and the revolving scrolls is maximized, i.e., the drawing pressure. The bypass holes 21 are open at symmetrical positions in the two symmetrical sections of the compression space formed by the engagement between the laps 5b and 6b of the two scrolls. As illustrated in FIG. 7, a check valve 22 formed of a flexible plate and a stopper 23 for restricting the opening of this valve are attached by a bolt 24 to a surface portion of the mirror plate 5a on the side remote from the lap where each bypass hole 21 is formed. The check valve 22 closes the bypass hole 21 if the pressure in a below-described bypass chamber 5f is higher than the pressure in the compression space, or opens the bypass hole 21 if the pressure in the compression space is higher than the pressure in the bypass chamber 5f, thereby forming a bypass passage for a flow from the compression space to the bypass chamber 5f.

The bypass chamber 5f is an annular space defined on the side of the mirror plate 5a of the stationary scroll 5 remote from the lap by projections 5d in the form of double rings and a cover 5e extending between top ends of the projections 5d. The bypass valve 22 is accommodated in the bypass chamber 5f. A bypass pipe 5g communicating with the bypass chamber 5f is connected to the cover 5e. The bypass pipe 5g extends to the outside by passing through the sealed casing 3.

The thus-constructed compressor 1 is connected as shown in FIG. 4, the change-over valve 462 is operated to provide communication between the pipe 5g and the inlet pipe 31, and the pressure in the bypass chamber 5f is set to the low pressure level of the refrigerating cycle to bypass the gas to the low pressure side of the refrigerant cycle during compression, thereby enabling a reduction in the rate at which the refrigerant flows through the heat exchanger (outlet flow rate). If the change-over valve 462 is changed over as shown in FIG. 4 to provide communication between the pipe 5g and the outlet pipe 32 and, hence, to connect the bypass chamber 5f to the high pressure side of the refrigerant cycle, the degree of excess compression inside the scroll compressor can be reduced under the condition that the operating conditions fall short of the set pressure ratio of the scroll laps.

In this embodiment, the bypass holes 21 are disposed at the positions in the symmetrical sections of the compressor close to the lap, but the same effects can also be obtained by disposing one bypass hole between the laps, as stated in Japanese Patent Unexamined Publication No. 61-187584.

Figure 8:
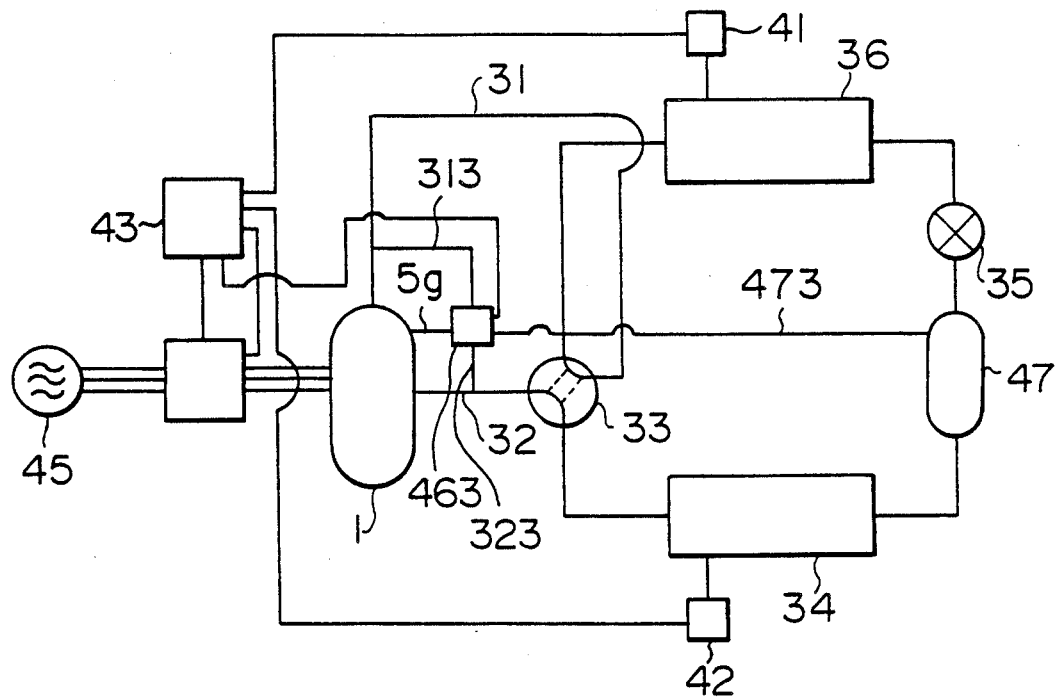
FIG. 8 is a diagram of an air conditioner in accordance with another embodiment of the present invention.

The flow rate controlling mechanisms of the above-described embodiments can reduce the rate at which the refrigerant flows through the heat exchanger (outlet flow rate of the compressor) but cannot increase this flow rate. FIG. 8 shows an embodiment which makes it possible to increase the flow rate.

In the embodiment shown in FIG. 8, a reservoir 47 is provided between the expansion valve 35 and the high-pressure-side heat exchanger (in this embodiment, indoor heat exchanger 34). The compressor 1 (the structure of which will be described in detail) is connected to the inlet pipe 31 via a piping 313 by the bypass pipe 5g and a change-over valve 463, to the outlet pipe 32 via the piping 323, and to the reservoir 47 via a piping 473.

Figure 10:
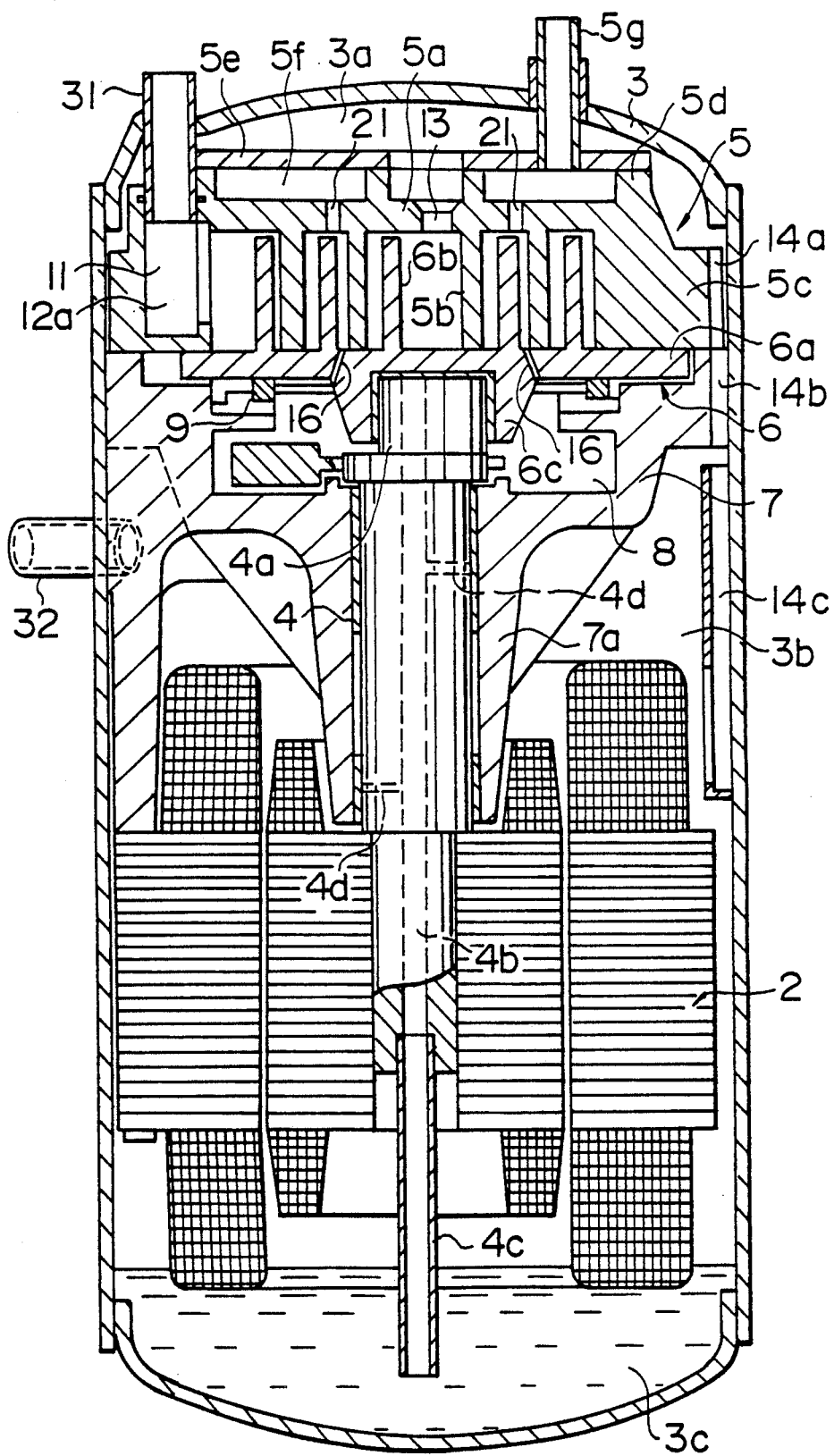
FIG. 10 is a cross-sectional view of the compressor shown in FIG. 8.
Figure 11:
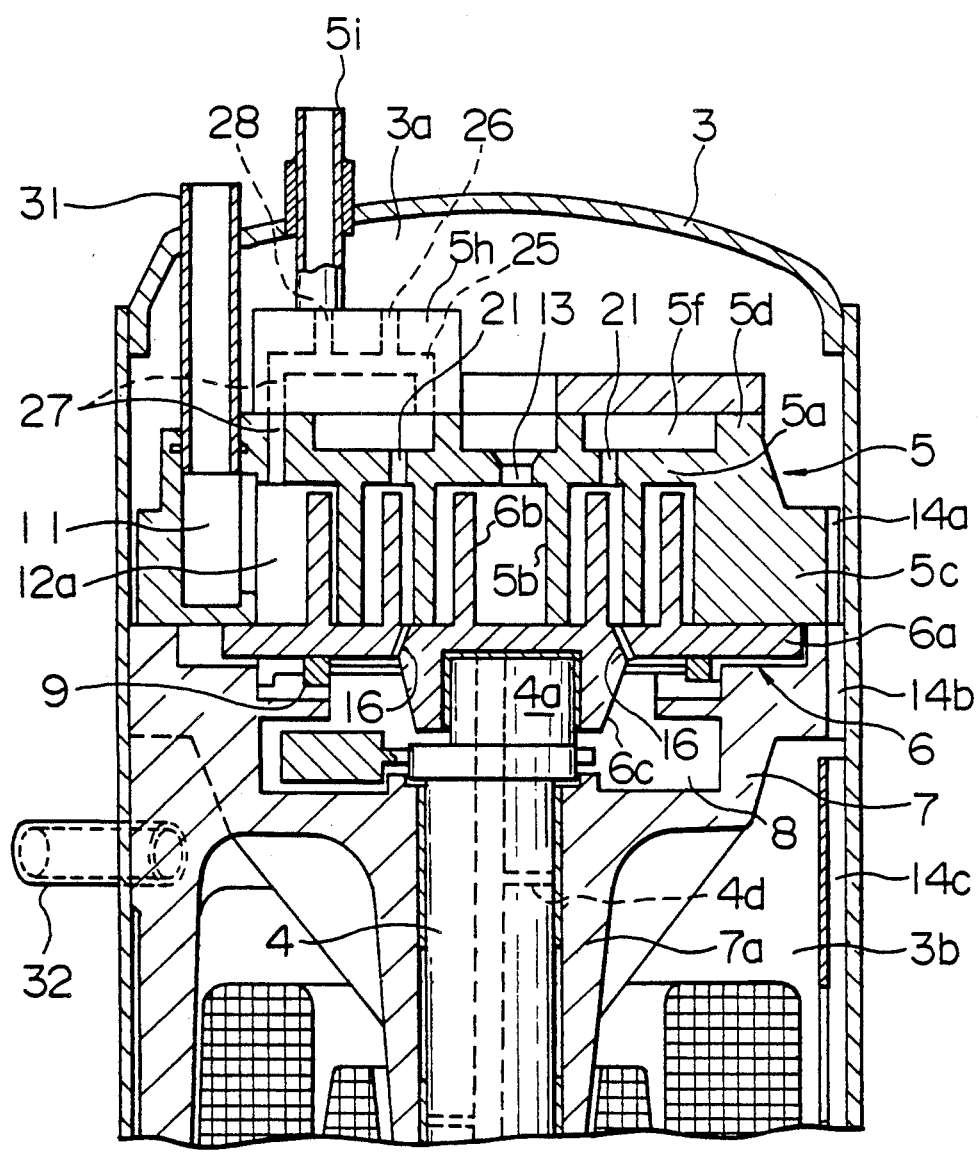
FIG. 11 is a cross-sectional view of a compressor incorporating a change-over valve.

In this embodiment, the later-described compressor illustrated in FIGS. 10 and 11 is employed to increase the outlet flow rate of the compressor (the rate at which the refrigerant flows through the heat exchanger) as well as to reduce the same.

Figure 9:
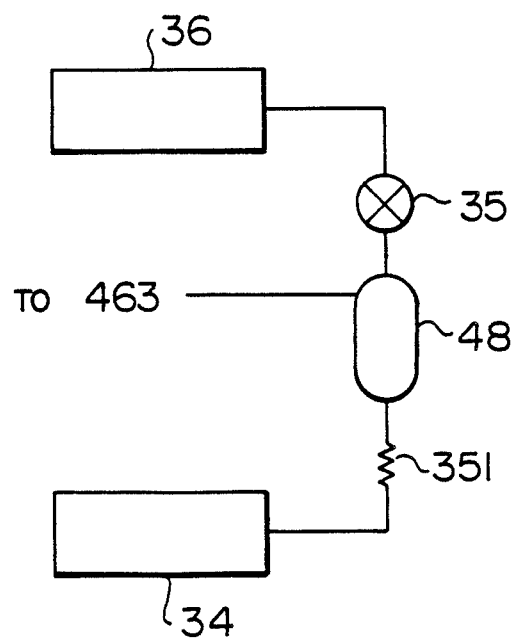
FIG. 9 is a diagram of a modification of part of the arrangement shown in FIG. 8.

This embodiment may be modified in such a manner that a first decompressor 351, a gas-liquid separator 48, and the expansion valve 35 are arranged as shown in FIG. 9, the gas phase of the gas-liquid separator 48 being connected to the bypass pipe 5g of the compressor via the change-over valve 463.

FIG. 10 shows the structure of the scroll compressor 1 employed in the embodiment shown in FIG. 8 (or the modified example shown in FIG. 9). This structure is similar to that of the scroll compressor shown in FIG. 5 but is not provided with the check valve 22 and the related members 23 and 24. Since there is no check valve, supercharging is effected if the pressure in the bypass chamber 5f is higher than the pressure in the compression space. If the pressure in the compression space is higher than the pressure in the bypass chamber 5f, the gas in the compression space is bypassed to the bypass chamber 5f, thereby reducing the discharge rate of the compressor.

In the embodiment of FIG. 8 or 9 in which the scroll compressor shown in FIG. 10 is used as the compressor 1, the change-over valve 463 is changed over as described below. That is, to reduce the discharge rate, the bypass chamber 5f and a low pressure side portion (inlet pipe) 31 are made to communicate with each other. To increase the discharge rate, the bypass chamber 5f and the reservoir 47 or the gas-liquid separator 48 are made to communicate with each other. If it is necessary to reduce the degree of excess compression, the bypass chamber 5f and a high pressure side portion (outlet pipe) 32 are made to communicate with each other. Ordinarily, the change-over valve 463 may be closed.

In this embodiment also, one bypass hole 21 may be disposed generally at the center between the laps, as in the case of the example shown in FIG. 5.

In the embodiments described above with reference to FIGS. 8 to 10, the change-over valve 463 is located outside the compressor, but this change-over valve can be accommodated in the sealed casing 3, as in the case of an embodiment shown in FIG. 11.

Referring to FIG. 11, a valve 5h is integrally formed of a cover and a change-over valve disposed on the top ends of the annular projections 5d on the side of the mirror plate 5a of the stationary scroll 5 remote from the lap. The valve 5h defines the bypass chamber 5f and has a passage 25 communicating with the bypass chamber 5f, a passage 26 communicating with the outlet chamber 3a, a passage 27 communicating with the inlet chamber 12a via the stationary scroll mirror plate 5a, a passage 28 communicating with an injection pipe 5i which passes through the sealed casing 3 and communicates with the outside, and a suitable change-over mechanism (not shown) for making the passage 25 communicating with the bypass chamber 5f communicate with one of the other passages 26 to 28 or closing the passage 25. This change-over mechanism can be operated from the outside of the compressor.

In this compressor, the passage 25 is made to communicate with the passage 27 to reduce the discharge rate, with the passage 28 to increase the discharge rate, or with the passage 26 to reduce the degree of excess compression. If there is no need for these effects, the passage 25 is closed.

This compressor can be used by connecting the injection pipe 5i of the compressor to the reservoir 47 or the gas-liquid separator 48 shown in FIG. 8 or 9, thus enabling simplification of the piping of the refrigerant circuit.

In this embodiment, the injection pipe is provided to enable an increase in the discharge rate. However, it is of course possible to remove the injection pipe 5i and the passage 28 if there is no need for increasing the discharge rate while the discharge rate can be reduced.

In the above-described embodiments, the discharge rate can be further reduced or increased without extending the range of changes in the rotational speed of the compressor, thus making it possible to provide an air conditioner which can be controlled according to a wide range of changes in the load to operate with an operation range which ensures high efficiency of the compressor operation.

What is claimed is:

1. A wide range capacity controllable air conditioner comprising:
    a refrigerant circuit including a refrigerant compressor, heat exchangers serving as a condenser and an evaporator, and expansion means provided between said heat exchangers;
    an inverter power supply means for changing the frequency of a current for supply of power to an electric motor for driving said refrigerant compressor to control the rotational speed of said motor;
    load detecting means;
    a controller for controlling said inverter power supply means in dependence upon an output from said load detecting means;
    refrigerant flow passage control means for changing, in accordance with an instruction from said controller, the rate at which a refrigerant flows from said refrigerant compressor to one of said heat exchangers, and
    wherein upper and lower limits of frequencies of the current for supply of power from said inverter power supply means to said refrigerator compressor driving motor are set, and said controller controls said inverter power supply means within the range between said upper and lower limits, and controls said refrigerant flow passage control means to change the refrigerant flow rate beyond a limit determined by one of said upper and lower limits.

2. A wide range capacity controllable air conditioner according to claim 1, wherein said load detecting means outputs results of detection of at least one of temperatures and pressures on high-pressure and low-pressure sides of said refrigerant circuit.

3. A wide range capacity controllable air conditioner according to claim 1, wherein said refrigerant flow passage control means includes a communication passage and a means for opening and closing said communication passage whereby a bypass can be formed between a refrigerant flow passage connecting an outlet of said refrigerant compressor and said condenser and a refrigerant passage connecting an inlet of said compressor and said evaporator.

4. A wide range capacity controllable air conditioner comprising:
    a refrigerant circuit including a refrigerant compressor, heat exchangers serving as a condenser and an evaporator, and expansion means provided between said heat exchangers;
    an inverter power supply means for changing the frequency of a current for supply of power to an electric motor for driving said refrigerant compressor to control the rotational speed of said motor;
    load detecting means;
    a controller for controlling said inverter power supply means in dependence upon an output from said load detecting means;
    refrigerant flow passage control means for changing, in accordance with an instruction from said controller, the rate at which a refrigerant flows from said refrigerant compressor to one of said heat exchangers,
    wherein said load detecting means outputs results of detection of at least one of temperatures and pressures on high-pressure and low-pressure sides of said refrigerant circuit, and
    wherein said controller controls the frequency of the current for supply of power from said inverter power supply means to said refrigerant compressor driving motor in dependence upon the difference between set temperatures and the temperatures on the high pressure and low-pressure sides of said refrigerant circuit detected by said load detecting means, and controls said refrigerant flow passage control means by comparing one of the temperatures and pressures on the high-pressure and low-pressure sides of said refrigerant circuit detected by said load detecting means with stored values of one of set temperatures and pressures corresponding to the power supply frequencies.

* * * * *